US009332145B2

(12) United States Patent
Lewis et al.

(10) Patent No.: US 9,332,145 B2
(45) Date of Patent: May 3, 2016

(54) PREVENTION OF EMPTY MEDIA TRAYS IN A PRINT SYSTEM

(71) Applicants: Harry Reese Lewis, Longmont, CO (US); Maryamossadat Nematollahi Mahani, Boulder, CO (US); Michael Anthony Rodriguez, Longmont, CO (US)

(72) Inventors: Harry Reese Lewis, Longmont, CO (US); Maryamossadat Nematollahi Mahani, Boulder, CO (US); Michael Anthony Rodriguez, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/476,594

(22) Filed: Sep. 3, 2014

(65) Prior Publication Data
US 2016/0065772 A1 Mar. 3, 2016

(51) Int. Cl.
G06F 3/12 (2006.01)
H04N 1/00 (2006.01)
B65H 7/20 (2006.01)
B65H 7/04 (2006.01)
B65H 1/04 (2006.01)

(52) U.S. Cl.
CPC ............ H04N 1/00689 (2013.01); B65H 1/04 (2013.01); B65H 7/04 (2013.01); B65H 7/20 (2013.01)

(58) Field of Classification Search
USPC .................................................. 358/1.15, 1.1
See application file for complete search history.

(56) References Cited

U.S. PATENT DOCUMENTS

| 6,963,699 | B1 | 11/2005 | Pearce |
| 7,864,352 | B2 | 1/2011 | Hull et al. |
| 8,342,501 | B2 | 1/2013 | Yoshimura et al. |
| 8,382,097 | B2 | 2/2013 | Chiba |
| 8,469,353 | B2 | 6/2013 | Unno |
| 2003/0025937 | A1* | 2/2003 | Christodoulou et al. .... 358/1.15 |
| 2012/0286465 | A1* | 11/2012 | Ooba ........................... 271/9.01 |
| 2014/0029055 | A1 | 1/2014 | Shimura |

FOREIGN PATENT DOCUMENTS

JP 200211771 A 8/2000

* cited by examiner

Primary Examiner — Martin Mushambo
(74) Attorney, Agent, or Firm — Duft Bornsen & Fettig LLP

(57) ABSTRACT

System and methods for prevention of empty media trays in a print system. In one embodiment, a system includes a print controller configured to receive a print job, and to initiate collection of media from a media tray based on information in the print job. The system also includes a supply detection module configured to detect a low supply of the media in the media tray, and to generate an error responsive to detection of the low supply before the media tray is empty. The print controller is configured to stop the collection of the media based on the error signal so that at least one sheet of the media remains in the media tray.

10 Claims, 7 Drawing Sheets

PREVENTION OF EMPTY MEDIA TRAYS IN A PRINT SYSTEM

FIELD OF THE INVENTION

The invention relates to the field of printing systems and, in particular, to media trays of print systems.

BACKGROUND

Print shops are typically medium or large scale facilities capable of supplying printing services to meet a variety of customer demands. Print shops often include a number of high-volume printers capable of printing incoming jobs quickly and at high quality. These printers may be managed by operators who can remove paper jams and reload the printers with media. Print shops also typically include post-print devices that are used to process the printed documents of each job (e.g., stackers, staplers, cutters, binders, etc.). Because print shops serve a variety of clients, they are often tasked with printing jobs that have varying printing formats, delivery dates, and media requirements.

There are sometimes discrepancies between media type(s) defined in the Digital Front End (DFE) and the media type(s) loaded in the media trays of the print shop printers. For example, an operator may load one type of media in a media tray but select a different type of media on the DFE. Rushed jobs and transitions between operators may also contribute to confusion as to what media types have been used in which media trays. As a result, when a printer runs out of media for a job, the media re-loaded in the media tray may be different than the media desired for the job. It thus remains a problem to ensure that the correct media is loaded at the printer.

SUMMARY

Embodiments described herein provide for prevention of empty media trays in a print system. When a media tray of a printer is nearly empty, the printer stops pulling media from the media tray so that at least some media remains in the media tray. The media tray may thus be readily observed for the media type in the media tray.

One embodiment is a system that includes a print controller configured to receive a print job, and to initiate collection of media from a media tray based on information in the print job. The system also includes a supply detection module configured to detect a low supply of the media in the media tray, and to generate an error based on the detection before the media tray is empty. The print controller is configured to stop the collection of the media based on the error signal so that at least one sheet of the media remains in the media tray.

The above summary provides a basic understanding of some aspects of the specification. This summary is not an extensive overview of the specification. It is not intended to identify key or critical elements of the specification nor to delineate any scope of particular embodiments of the specification, or any scope of the claims. Its sole purpose is to present some concepts of the specification in a simplified form as a prelude to the more detailed description that is presented later. Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
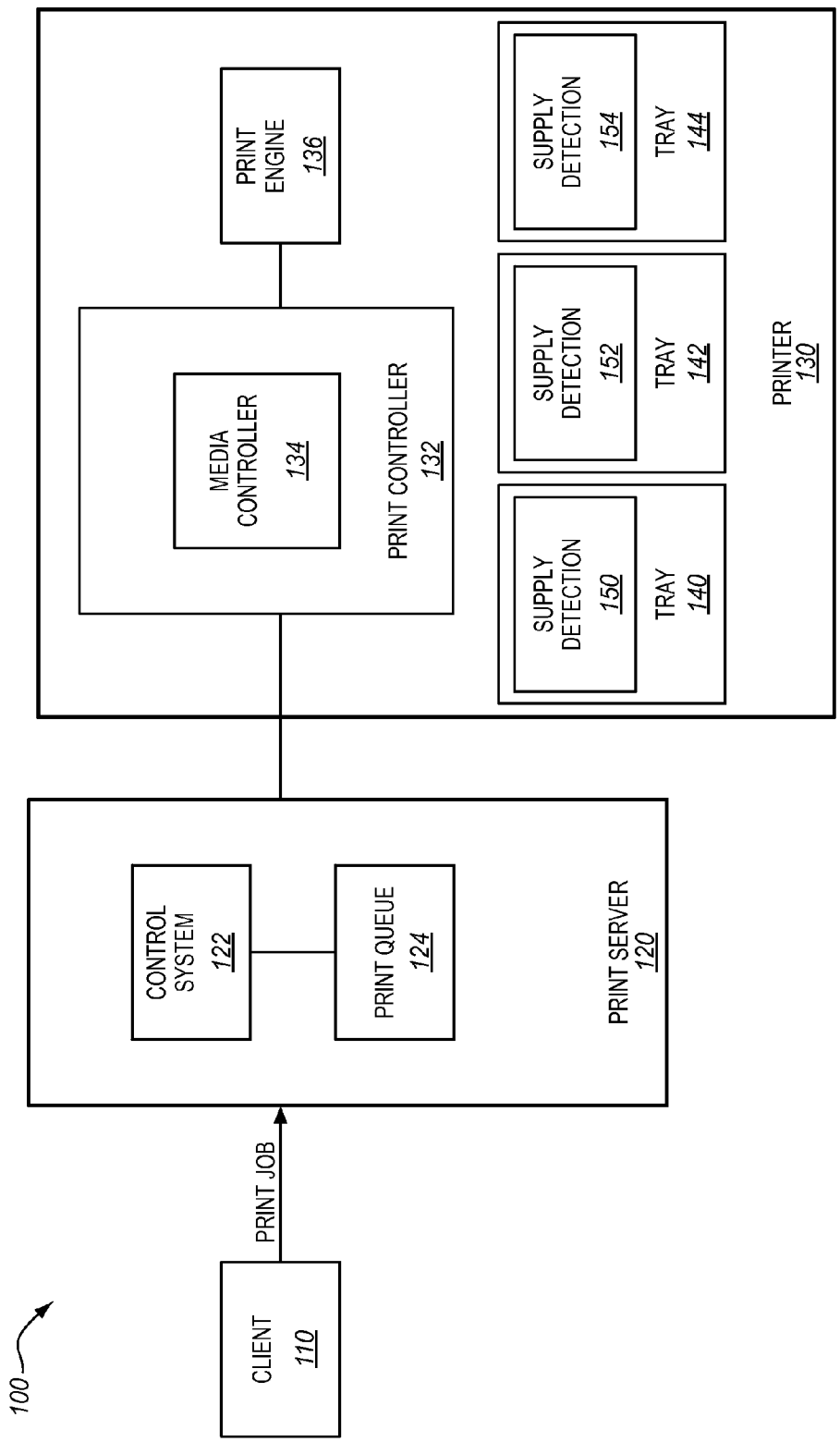
FIG. 1 is a block diagram of a printing system in an exemplary embodiment.

FIG. 1 is a block diagram of a printing system 100 in an exemplary embodiment. Printing system 100 comprises a print server 120 coupled with one or more printers 130. Print server 120 receives print jobs from client 110 and implements scheduling of the jobs at printer 130. Printer 130 includes any device for transforming print data onto a suitable printable medium, such as paper, and may include large, multi-tray production printing systems used for high volume printing.

Client 110 may include banks, credit card companies, or other entities with printing needs (e.g., monthly bank statements, monthly credit card bills, etc.). Print server 120 may receive print jobs from client 110 in a number of different formats, such as Portable Document Format (PDF), Mixed Object: Document Content Architecture (MO:DCA), etc. Job tickets defining properties associated with the print data of the job may be received from client 110 in a number of different formats, such as Job Definition Format (JDF), Print Production Format (PPF), Portable Job Ticket Format (PJTF), etc.

Print server 120 includes a control system 122 and a print queue 124. Control system 122 communicates with printer 130 to determine status information (e.g., error conditions, printing progress for jobs, etc.) for printer 130. Control system 122 further manages one or more jobs stored by queue 124. Queue 124 generally includes any storage system that is able to spool or store jobs that are scheduled for printing at printer 130. Some examples of queue 124 include hard disk drives, flash drives, Random Access Memory, etc.

Printer 130 includes a print controller 132, a print engine 136, and one or more media trays 140-144. Print controller 132 receives print jobs from control system 122 for imprinting onto a printable media via print engine 136. The print job may also include a job ticket that defines various characteristics of the print job, such as the type of media to use when printing the job (e.g., size, weight, color, etc.), the number of logical pages per sheet side, which media trays at the printer to pull media from when printing the job, etc.

In prior systems, the printer prints from a media tray that is identified for the job until the media tray is empty. A printer in a typical print shop may include several media trays and print on a wide variety of different media types. Therefore, when the printer empties a media tray it is often difficult for an operator to remember the type of media that was previously loaded in that media tray. Even if a media type has been reported for a media tray (e.g., reported through Simple Network Management Protocol (SNMP) or set by a print operator), it is not uncommon for the reported information to be incomplete or inaccurate. If a different type of media is loaded in the media tray because there is confusion as to the type of media that was in the media tray before it was emptied, a resumed print job may be printed with an undesirable media type.

The printer 130 is therefore modified with a media controller 134 that is operable to prevent media trays 140-144 from being emptied by operations of print controller 132. Media controller 134 is communicatively coupled with supply detection modules 150-154 in each of the respective media trays 140-144. Supply detection modules 150-154 alert media controller 134 when a media tray 140-144 is nearly empty so that media controller 134 suspends collection of media before media tray 140-144 is empty. Media controller 134 alerts a user to replenish media tray 140-144 with more of the same media type. Since media tray 140-144 is prevented from being depleted of media, the user is able to easily determine correct media for media tray 140-144.

Figure 2:
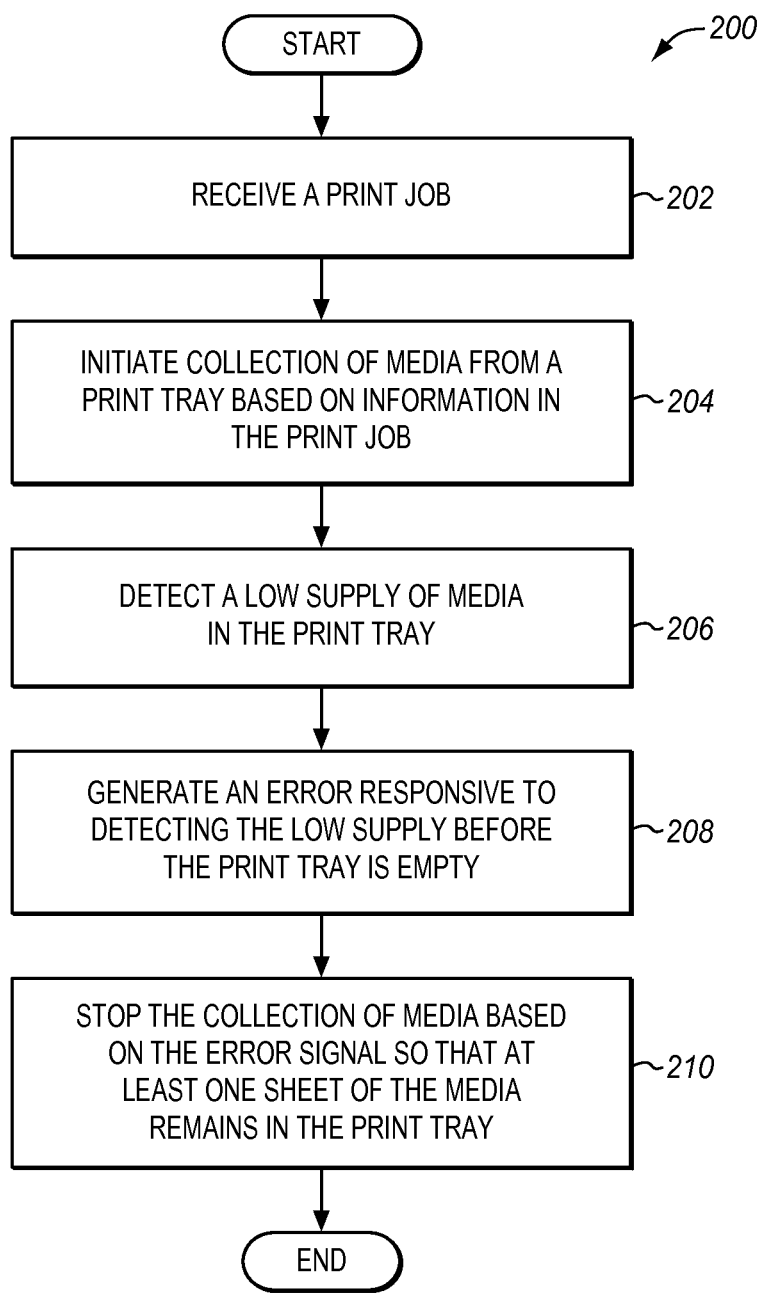
FIG. 2 is a flow chart illustrating a method for prevention of empty media trays in an exemplary embodiment.

FIG. 2 is a flow chart illustrating a method 200 for prevention of empty media trays in an exemplary embodiment. The steps of the method 200 will be described with respect to printing system 100 of FIG. 1, although one skilled in the art will understand that method 200 may be performed by other systems not shown. The steps of the method 200 described herein are not all inclusive and may include other steps not shown. The steps for the flow charts shown herein may also be performed in an alternative order.

Assume for this embodiment that control system 122 receives a print job from client 110 for printing and stores the print job in print queue 124 for scheduling with one or more printers. Control system 122 identifies a printer (e.g., printer 130) and an associated media tray (e.g., 140-144) for the print job. For example, control system 122 may match one or more media properties specified in the print job with a descriptor of media tray (e.g., "Blue Letter), or the print job may specify a media tray of the printer (e.g., "tray 1"). Therefore, control system 122 may identify a printer 130 and/or an input tray of the printer 130 by reading a setting previously stored in memory. With a printer, and/or a media tray identified for the print job, the control system 122 schedules the print job with the appropriate printer and submits the print job to the printer.

At step 202, print controller 132 receives the print job. The print job comprises print data and properties associated with the print data (e.g., a job ticket indicating the media type for the print job, etc.). At step 204, print controller 132 initiates collection of media from a media tray based on information in the print job. Media trays 140-144 are locations of printer 130 that store media (e.g., paper) for printing. A single print job may indicate several types of media to be pulled from several different media trays. For example, a print job may specify standard pages, different colors of paper, separator sheets (e.g., for chapters), tabs, pre-printed inserts (e.g., front/back covers), etc. Print controller 132 may therefore initiate collection of media from multiple media trays 140-144 based on information in the print job.

At step 206, a supply detection module 150-154 detects a low supply of the media in the media tray. At step 208, supply detection module 150-154 generates an error signal responsive to detecting the low supply of media before the media tray is empty. At step 210, media controller 134 stops the collection of the media based on the error signal so that at least one sheet of the media remains in the media tray.

Using method 200, at least some media (e.g., one sheet of paper) is left in each of the media trays 140-144 of printer 130. When an alert is generated indicating a low paper supply in one or more media trays 140-144 of printer 130, a print operator may open the media tray identified in the error message, observe the media type, replenish the supply of that media type in the media tray, and resume print operation from that media tray. Thus, the possibility of user confusion as to which media type has been previously in used in each media tray 140-144 is reduced or eliminated. A low supply of media may therefore comprise any supply of media that is non-zero.

In one embodiment, media tray(s) 140-144 are implemented as a drawer which slides horizontally into and out of a corresponding compartment of a printer (e.g., printer 130). The drawer includes a receptacle in which a stack of printing paper of various sizes and types may be held. The drawer is closed during print operation and pick rollers are moved into position on top of the stack of paper for driving individual sheets of paper into the printer feedpath. As the individual sheets leave media tray 140-144, one or more drive rollers transport the sheet through a paper path of the printer 130 for printing via a print engine 136.

In another embodiment, media controller 134 is operable with components/functions of printer 130, print controller 132, and/or control system 122 to disengage or stop a pick roller from transporting media from the media tray 140-144 to the feedpath of the printer 130. For example, message(s) may be relayed from media controller 134 to print controller 132 or control system 122 to initiate shut-down sequences or suspension/rescheduling of the print job. In a further embodiment, the media controller 134 is coupled or integrated into an existing function(s) of the printer 130 and/or print server 120 that perform an "empty tray" error operation. Media controller 134, in conjunction with supply detection modules 150-154, is configured to override, or trigger, the empty tray error operation before a media tray 140-144 is actually depleted. Printer 130 is therefore configured to prevent empty media trays using existing communications, suspension sequences, rescheduling of print jobs, etc. of printing system 100. Thus, method 200 may be performed with minimal modification to printing system 100.

FIGS. 3-6 illustrate media trays operable to prevent media depletion in exemplary embodiments. FIGS. 3A and 3B illustrate a media tray in two different instances (e.g., 300 and 350). Media tray 300/350 includes a pick roller 310 to transport individual sheets of media 302 to a feed roller 312 which in turn transports the sheet through the printer 130 for printing via print engine 136. Media tray 300/350 is enhanced with a light source 320 operable to emit light and a light detection module 322 operable to detect the emitted light from the light source 320. Light detection module 322 is operable to alert media controller 134 of a deficient supply of the media 302 in the media tray 300/350.

Figure 3A:
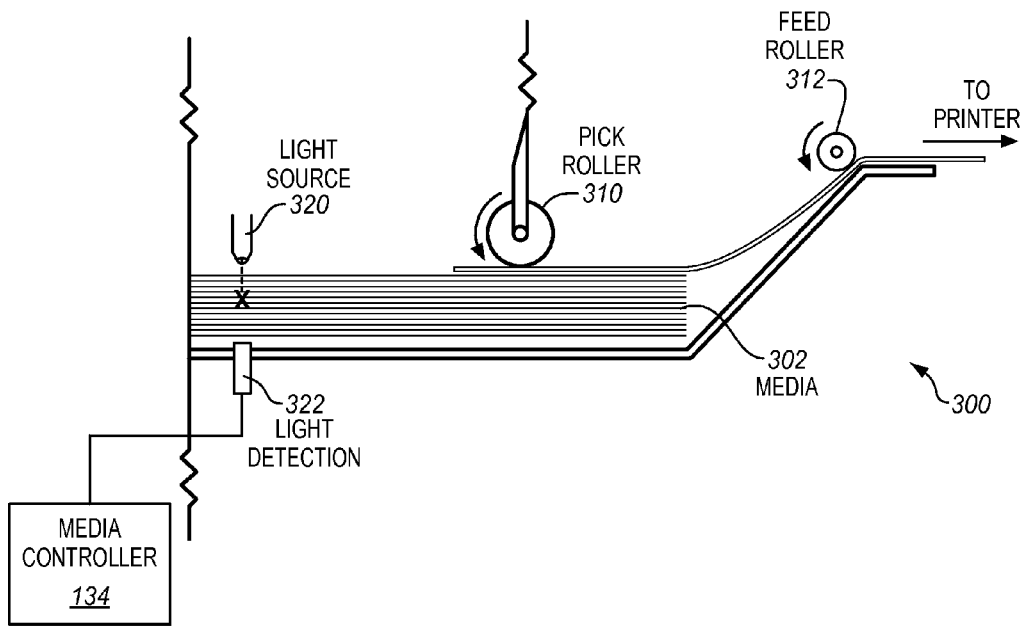
FIG. 3A illustrates a media tray in a first view in an exemplary embodiment.
Figure 3B:
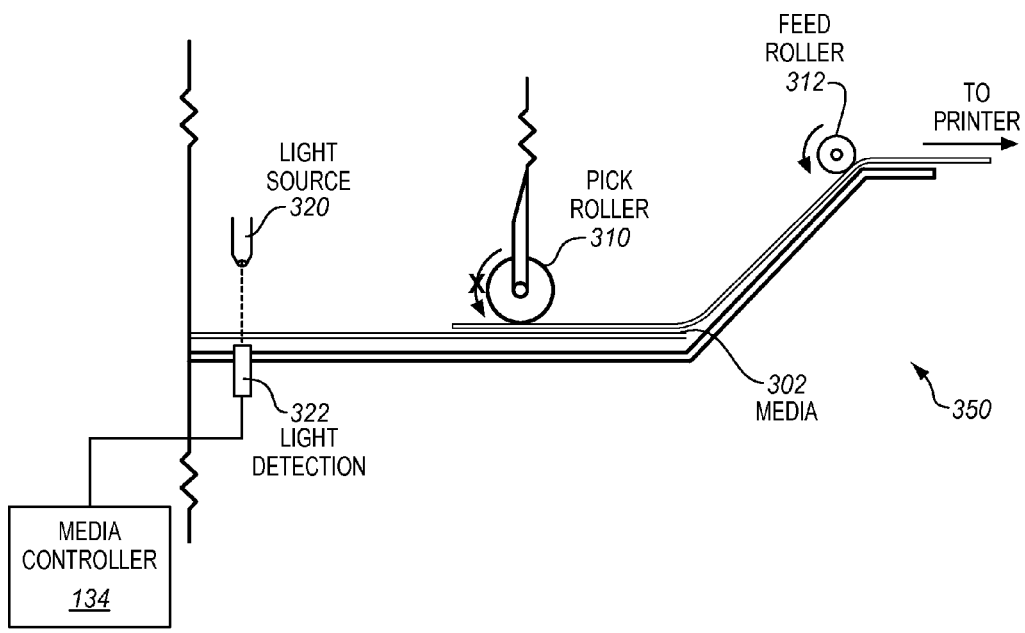
FIG. 3B illustrates a media tray in a second view in an exemplary embodiment.

As shown in FIG. 3A, light detection module 322 does not detect light emitted from light source 320 when the supply of media 302 in the media tray 300 sufficiently thick. As print operations continue, the top most sheet of the stack of media 302 is individually removed from the media tray. At some point, the stack of media 302 is depleted enough such that light detection module 322 detects the light emitted from light source 320 (e.g., few sheets of media 301 remain in media tray 350) as shown in FIG. 3B. In response, light detection module 322 generates/communicates a signal for media controller 134 to stop collection of media 302 from media tray 300/350 (e.g., directs pick roller 310 to disengage, suspends print job, initiates error sequences, etc.). The light detection may occur as an individual sheet of media 302 is in the process of being transported, therefore, media controller 134 may be configured to allow printing operation(s) to resume for that individual sheet and initiate cancellation procedures at the next individual sheet of media 302.

Moreover, the light emission and detection may be configured in a variety of ways by matter of design choice. For example, light emission and detection may be tailored to the type of media (e.g., thickness, gloss, color, etc.) such that the light does not penetrate through the media type until a small but non-zero number of sheet(s) remain (e.g., one sheet, two sheets, etc.) disposed between the light source 320 and light detection module 322. Light emission and corresponding detection may be configured as light emitting diodes (LEDs), lasers, etc., and each media tray 140-144 may include one or more of each in various locations by matter of design choice. For example, light emission and detection may be configured vertically in media tray (e.g., similar to that shown in FIGS. 3A. and 3B) or alternatively may be configured horizontally in media tray.

Configured properly, the signal produced by light detection module 322 ensures that at least one sheet of media 302 remains in media tray 300/350 and is available for inspection. Media controller 134 may resume print operations in response to satisfied conditions (e.g., drawer is closed, no light received at light detection module 322, etc.). In one embodiment, paper thickness and/or light detection threshold values are obtained from an existing double-sheet feed mechanism of printer or media tray that automatically calibrates to media types.

Figure 4:
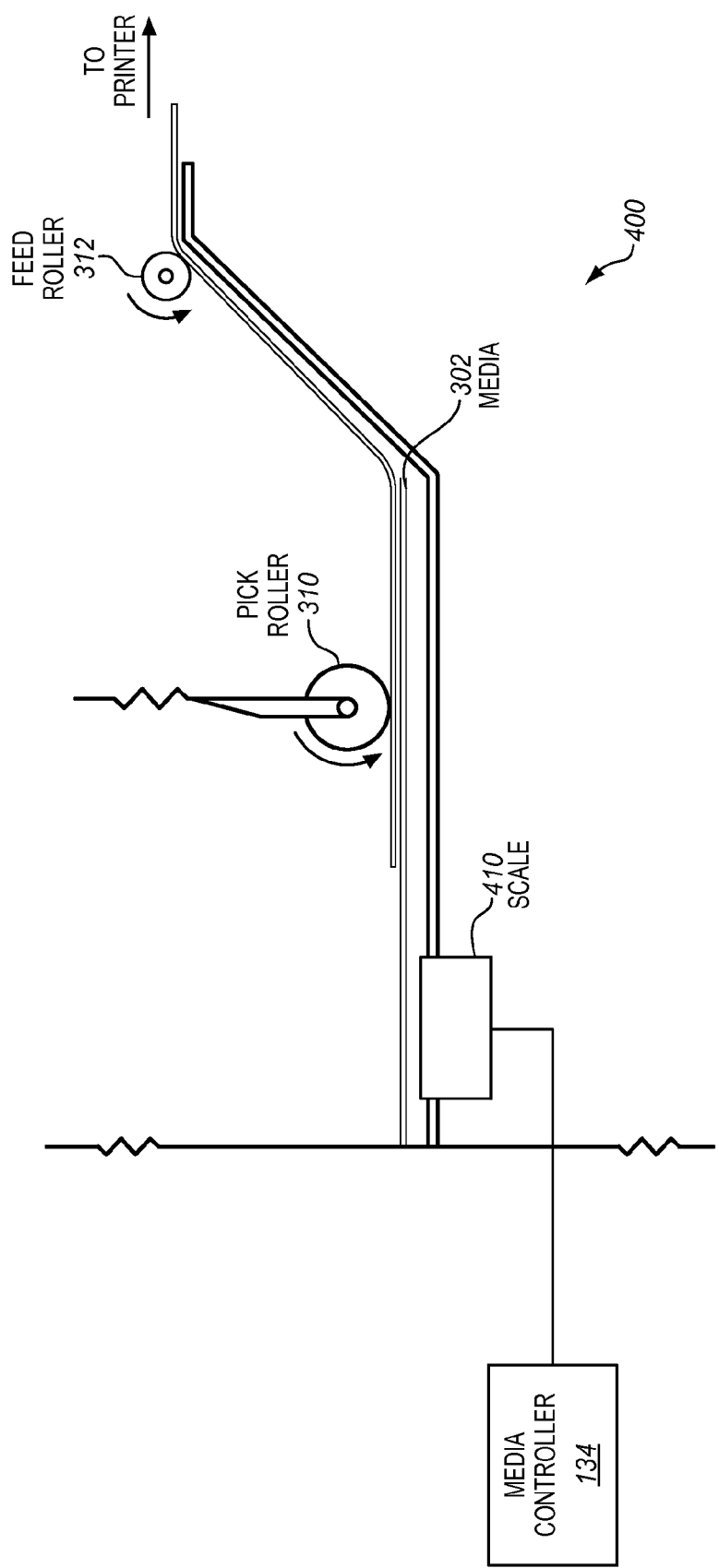
FIG. 4 illustrates a media tray operable to prevent media depletion in another exemplary embodiment.

FIG. 4 illustrates a media tray 400 operable to prevent media depletion in another exemplary embodiment. In this embodiment, media tray 400 includes a scale 410 operable to weigh the media in media tray 400. As sheets are removed from media tray 400 for printing, the total weight applied to scale 410 is incrementally decreased. Scale 410 is configured with media controller 134 to generate a signal for stopping media collection from media tray 400 in response to a detection that the weight of the media 302 is below a non-zero threshold. Scale 410 and/or media controller 134 may be configured to generate a signal when the weight is at or below the weight of a specified number of sheets. For example, an operator may store a figure in memory that is representative of a weight of one sheet, two sheet(s) etc. Scale 410 or media controller 134, in conjunction with the stored value in memory, initiates stoppage of media collection before the last sheet of media 302 is removed from media tray 400. As above, media controller 134 may initiate resuming print operations when scale 410 detects a weight that is higher than the stored weight threshold value.

Figure 5:
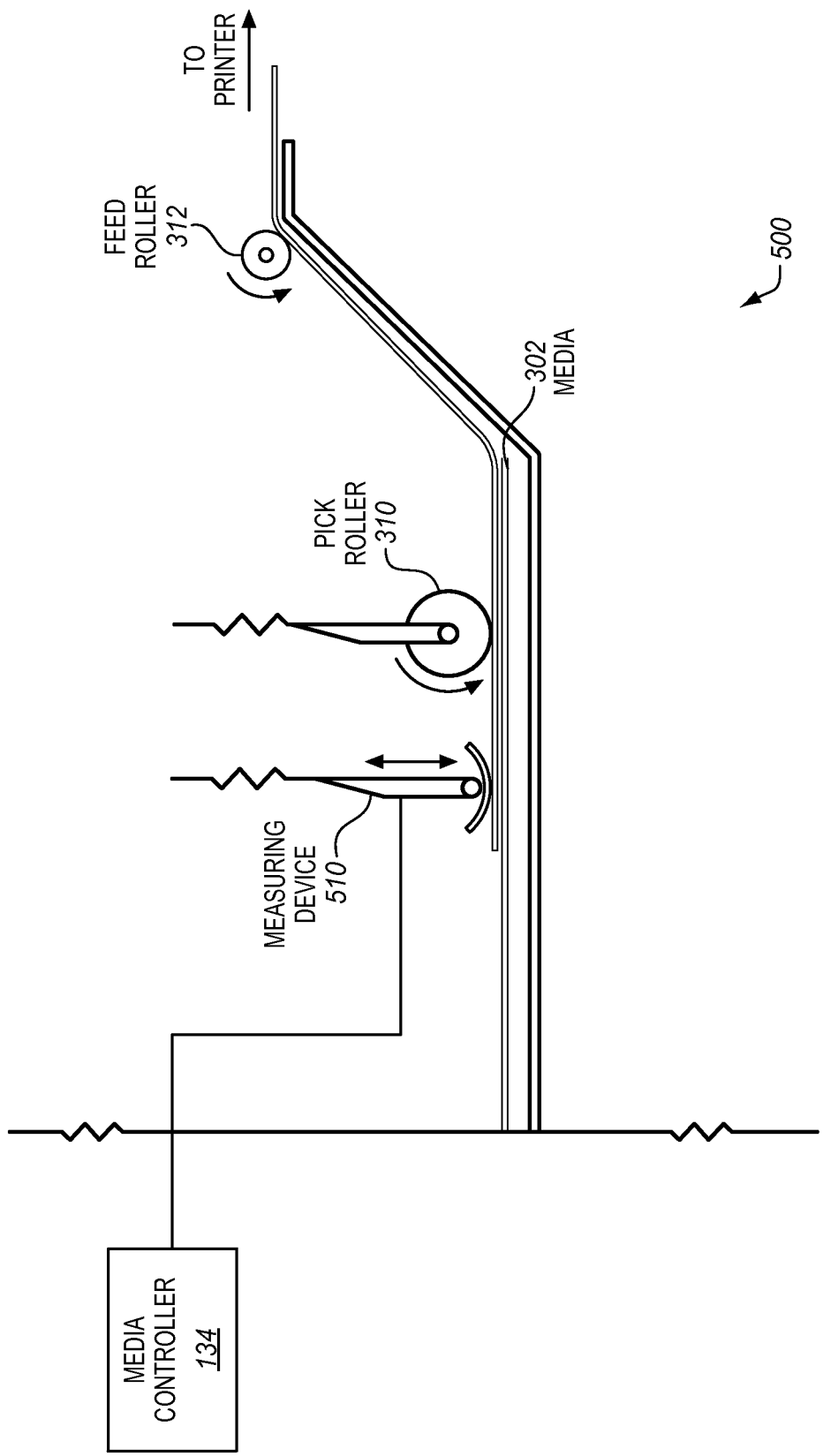
FIG. 5 illustrates a media tray operable to prevent media depletion in another exemplary embodiment.

FIG. 5 illustrates a media tray 500 operable to prevent media depletion in another exemplary embodiment. Media tray 500 includes measuring device 510 that detects/measures stack of media 302 as it is collected from media tray 500. For example, measuring device 500 may track a distance from a top sheet of media 302 in the stack with respect to a bottom of media tray 500 to ensure, in conjunction with media controller 134, that at least the last sheet of media 302 is not removed from media tray 500 by pick roller 310.

In one embodiment, measuring device 510 is a linear variable differential transformer (LVDT) that rests on top of the stack of media 302 and detects individual sheets of media 302 being removed from underneath. LVDT supplies distance changes/information to media controller 134 which tracks a vertical position of the LVDT in media tray 500. When LVDT is within a distance (e.g., distance threshold stored in memory) with respect to a bottom surface of media tray 500, a signal is generated to stop collection of media 302 from media tray 500. Therefore, measuring device 510 (e.g., LVDT) or media controller 134, in conjunction with the stored distance value in memory, initiates stoppage of media collection before the last sheet of media 302 is removed from media tray 500. Again, media controller 134 may initiate resuming print operations when measuring device 510 is no longer within the threshold distance that is stored in memory.

Figure 6:
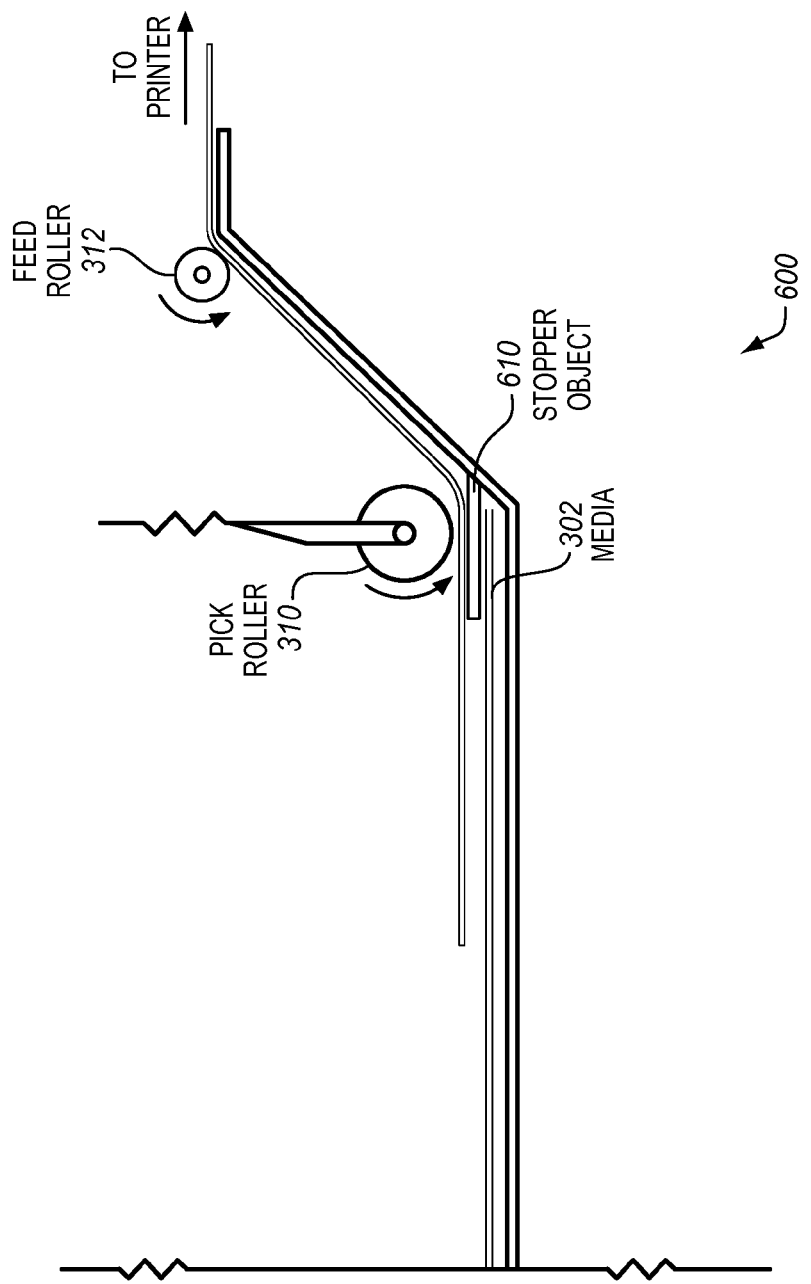
FIG. 6 illustrates a media tray operable to prevent media depletion in another exemplary embodiment.

FIG. 6 illustrates a media tray 600 operable to prevent media depletion in another exemplary embodiment. Media tray 600 includes a stopper object 610 that physically prevents pick roller 310 from reaching one or more sheets of media 302 at the bottom of the stack. Stopper object 610 may be reconfigurable (e.g., removed, flipped) within media tray 600 such that a user has an option to prevent media depletion. Stopper object may be operable to detect contact with pick roller 310 (and/or communicatively coupled to media controller 134) to initiate above-described error alerts and sequences.

Though described with respect to printing system 100 of FIG. 1, those of ordinary skill in the art will appreciate that FIGS. 3-6 may be operable on a variety of print systems. The particular configuration including shape, size, number or location of the media tray(s), pick roller(s), drive roller(s), light detection module(s), light source(s), scale(s), measuring device(s), stopper object(s) etc., may vary by matter of design choice.

Figure 7:
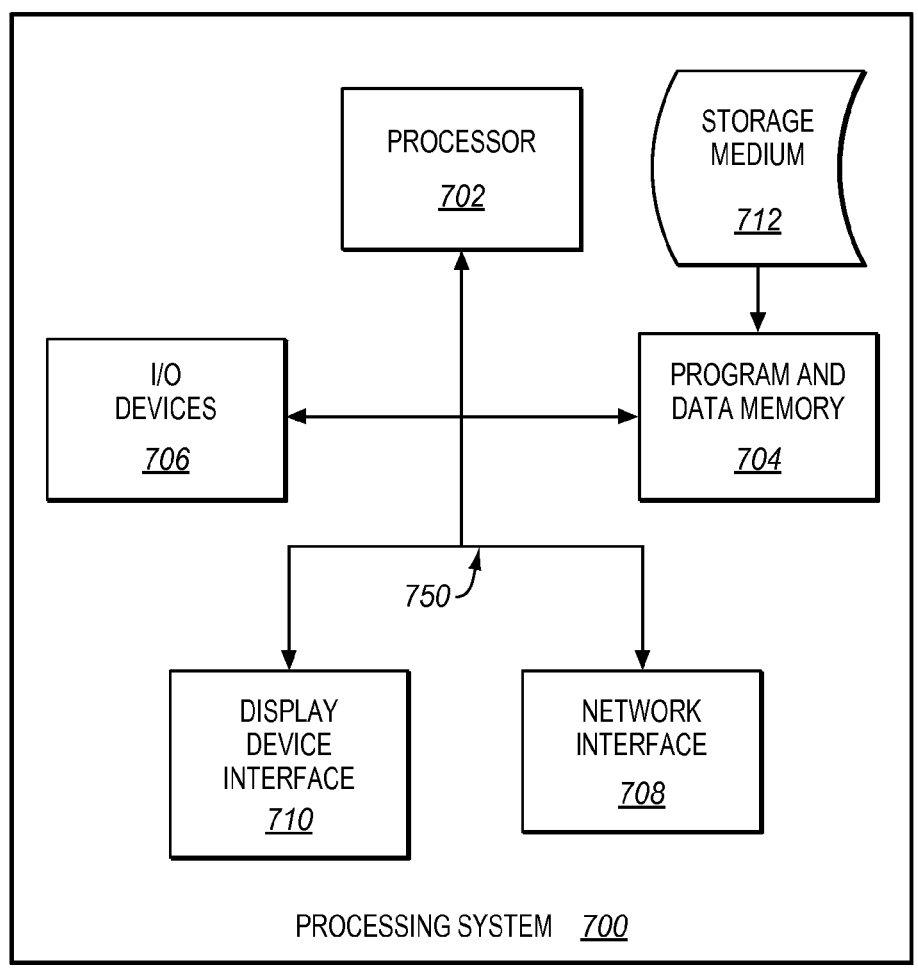
FIG. 7 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct processing system(s) of the print server 120 to perform the various operations disclosed herein. FIG. 7 illustrates a processing system 700 configured to execute a computer readable medium embodying programmed instructions to perform desired functions in an exemplary embodiment. Processing system 700 is configured to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, SCSI, Fibre Channel, and Ethernet cards are just a few of the currently available types of network or host interface adapters. Presentation device interface 710 may be integrated with the system to interface to one or more presentation devices, such as printing systems and displays for presentation of presentation data generated by processor 702. Although specific embodiments were described herein, the scope of the inventive concept(s) is not limited to those specific embodiments. The scope of the inventive concept(s) is defined by the following claims and any equivalents thereof.

We claim:

1. A system comprising:
   a print controller configured to receive a print job, and to initiate collection of media from a media tray based on information in the print job; and
   a supply detection module configured to detect a low supply of the media in the media tray, and to generate an error signal responsive to detection of the low supply before the media tray is empty;
   the print controller is configured to stop the collection of the media based on the error signal so that at least one sheet of the media remains in the media tray;
   wherein the supply detection module comprises:
     a light source configured to emit light in a direction toward a surface of a side of the media;
     a light detector configured to detect the emitted light through the surface on an opposite side of the media; and
     a trigger configured to generate the error signal in response to detection of the emitted light.

2. The system of claim 1 wherein:
   the print controller is configured to resume collection of the media from the media tray in response to a determination that the light detector is not receiving the emitted light.

3. The system of claim 1 wherein:
   the print controller is configured to suspend the print job based on the error signal in order to stop the collection of the media from the media tray.

4. The system of claim 1 further comprising:
   a stopper in the media tray configured to prevent a pick roller from collecting at least one sheet of the media from the media tray.

5. A method comprising:
   receiving a print job; initiating collection of media from a media tray based on information in the print job;
   detecting a low supply of the media in the media tray;
   generating an error signal responsive to detecting the low supply before the media tray is empty; and
   stopping the collection of the media based on the error signal so that at least one sheet of the media remains in the media tray;
   wherein the detection of the low supply of the media comprises:
     emitting light in a direction toward a surface of a side of the media;
     detecting the emitted light through the surface on an opposite side of the media; and
     generating the error signal in response to detection of the emitted light.

6. The method of claim 5 comprising:
   suspending the print job based on the error signal in order to stop the collection of the media from the media tray.

7. The method of claim 5 comprising:
   coupling to a function of the system that generates a signal that indicates the media tray is empty; and
   triggering the function before the media tray is empty.

8. The method of claim 5 comprising:
   preventing, with a stopper installed in the media tray, a pick roller from collecting at least one sheet of the media from the media tray.

9. A system comprising:
   a print controller configured to receive a print job, and to initiate collection of media from a media tray based on information in the print job; and
   a supply detection module configured to detect a low supply of the media in the media tray, and to generate an error signal responsive to detection of the low supply before the media tray is empty;
   the print controller is configured to stop the collection of the media based on the error signal so that at least one sheet of the media remains in the media tray;
   wherein the supply detection module comprises:
     a scale configured to weigh the media; and
     a trigger configured to generate the error signal when the weight of the media is below a non-zero threshold.

10. The system of claim 9 wherein:
    the print controller is configured to resume collection of the media from the media tray in response to a determination that the weight of the media is above the non-zero threshold.

* * * * *